(12) United States Patent
Govindaswamy et al.

(10) Patent No.: US 6,870,963 B2
(45) Date of Patent: Mar. 22, 2005

(54) CONFIGURABLE PATTERN OPTIMIZER

(75) Inventors: Senthil Govindaswamy, San Diego, CA (US); Kadayam Thyagarajan, San Diego, CA (US); Jeffrey A. Levin, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 642 days.

(21) Appl. No.: 09/882,753

(22) Filed: Jun. 15, 2001

(65) Prior Publication Data

US 2003/0007698 A1 Jan. 9, 2003

(51) Int. Cl.$^7$ ................................................ G06K 9/46
(52) U.S. Cl. ................................... 382/250; 382/166
(58) Field of Search ................................ 382/166, 232, 382/238–240, 246, 248, 250, 251; 348/395.1; 358/426.14; 375/240.02, 240.03, 240.14

(56) References Cited

U.S. PATENT DOCUMENTS

| | | | |
|---|---|---|---|
| 5,021,891 A | | 6/1991 | Lee ............................ 382/250 |
| 5,241,395 A | * | 8/1993 | Chen ..................... 358/426.14 |
| 5,452,104 A | | 9/1995 | Lee ....................... 358/426.14 |
| 5,724,451 A | * | 3/1998 | Shin et al. .................. 382/240 |
| 5,903,669 A | * | 5/1999 | Hirabayashi ................ 382/232 |
| 6,668,019 B1 | * | 12/2003 | Owen et al. ........... 375/240.14 |

FOREIGN PATENT DOCUMENTS

| | | |
|---|---|---|
| EP | 0862339 | 2/1998 |
| WO | 0135673 | 11/2000 |
| WO | 0156298 | 1/2001 |

OTHER PUBLICATIONS

Bracamonte, et al "Adaptive Block–Size Transform Coding For Image Compression", IEEE, pp. 2721–2724, 1997.*
Vaisey, et al. "Image Compression With Variable Block Size Segmentation", IEEE, pp. 2040–2060, 1992.*
XP 000498064 Lee, Jong H. et al. "An Efficient Encoding of DCT Blocks with Block–Adaptive Scanning." pp. 1483–1494.

* cited by examiner

Primary Examiner—Daniel Mariam
(74) Attorney, Agent, or Firm—Sandip (Micky) S. Minhas; Philip Wadsworth; Milan Patel

(57) ABSTRACT

An apparatus and method of serializing frequency based image data in a digital cinema system is described. At least one group of data that may be represented as a 16×16 block of data is compiled. Alternatively, a frame of data is compiled. The group of data is divided into four groups, each which may be represented as an 8×8 blocks. Each of the four 8×8 blocks of data are serialized using zig-zag scanning vertical scanning, and/or horizontal scanning.

35 Claims, 10 Drawing Sheets

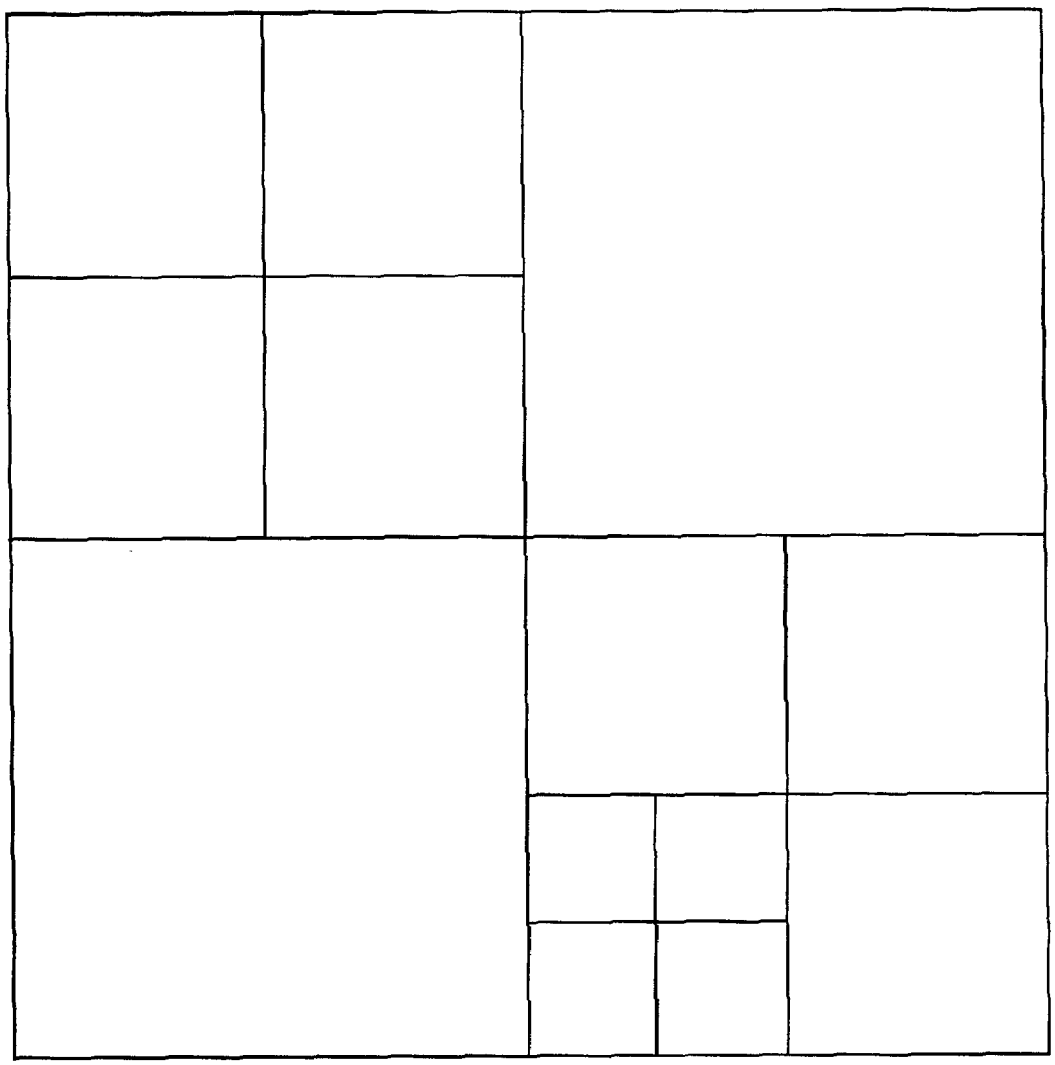
FIG. 4a
400

402

CONFIGURABLE PATTERN OPTIMIZER

BACKGROUND OF THE INVENTION

I. Field of the Invention

The present invention relates to image processing and compression. More specifically, the present invention relates to a configurable pattern optimizer for compressed images.

II. Description of the Related Art

Digital picture processing has a prominent position in the general discipline of digital signal processing. The importance of human visual perception has encouraged tremendous interest and advances in the art and science of digital picture processing. In the field of transmission and reception of video signals, such as those used for projecting films or movies, various improvements are being made to image compression techniques. Many of the current and proposed video systems make use of digital encoding techniques. Aspects of this field include image coding, image restoration, and image feature selection. Image coding represents the attempts to transmit pictures of digital communication channels in an efficient manner, making use of as few bits as possible to minimize the band width required, while at the same time, maintaining distortions within certain limits. Image restoration represents efforts to recover the true image of the object. The coded image being transmitted over a communication channel may have been distorted by various factors. Source of degradation may have arisen originally in creating the image from the object. Feature selection refers to the selection of certain attributes of the picture. Such attributes may be required in the recognition, classification, and decision in a wider context.

Digital encoding of video, such as that in digital cinema, is an area which benefits from improved image compression techniques. Digital image compression may be generally classified into two categories: loss-less and lossy methods. A loss-less image is recovered without any loss of information. A lossy method involves an irrecoverable loss of some information, depending upon the compression ratio, the quality of the compression algorithm, and the implementation of the algorithm. Generally, lossy compression approaches are considered to obtain the compression ratios desired for a cost-effective digital cinema approach. To achieve digital cinema quality levels, the compression approach should provide a visually loss-less level of performance. As such, although there is a mathematical loss of information as a result of the compression process, the image distortion caused by this loss should be imperceptible to a viewer under normal viewing conditions.

Existing digital image compression technologies have been developed for other applications, namely for television systems. Such technologies have made design compromises appropriate for the intended application, but do not meet the quality requirements needed for cinema presentation.

Digital cinema compression technology should provide the visual quality that a moviegoer has previously experienced. Ideally, the visual quality of digital cinema should attempt to exceed that of a high-quality release print film. At the same time, the compression technique should have high coding efficiency to be practical. As defined herein, coding efficiency refers to the bit rate needed for the compressed image quality to meet a certain qualitative level. Moreover, the system and coding technique should have built-in flexibility to accommodate different formats and should be cost effective; that is, a small-sized and efficient decoder or encoder process.

Many compression techniques available offer significant levels of compression, but result in a degradation of the quality of the video signal. Typically, techniques for transferring compressed information require the compressed information to be transferred at a constant bit rate.

One compression technique capable of offering significant levels of compression while preserving the desired level of quality for video signals utilizes adaptively sized blocks and sub-blocks of encoded Discrete Cosine Transform (DCT) coefficient data. This technique will hereinafter be referred to as the Adaptive Block Size Discrete Cosine Transform (ABSDCT) method. This technique is disclosed in U.S. Pat. No. 5,021,891, entitled "Adaptive Block Size Image Compression Method And System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Differential Quadtree Transform technique is discussed in U.S. Pat. No. 5,452,104, entitled "Adaptive Block Size Image Compression Method And System," also assigned to the assignee of the present invention and incorporated herein by reference. The systems disclosed in these patents utilize what is referred to as "intra-frame" encoding, where each frame of image data is encoded without regard to the content of any other frame. Using the ABSDCT technique, the achievable data rate may be reduced from around 1.5 billion bits per second to approximately 50 million bits per second without discernible degradation of the image quality.

The ABSDCT technique may be used to compress either a black and white or a color image or signal representing the image. The color input signal may be in a YIQ format, with Y being the luminance, or brightness, sample, and I and Q being the chrominance, or color, samples for each 4×4 block of pixels. Other known formats such as the YUV, $YC_bC_y$ or RGB formats may also be used. Because of the low spatial sensitivity of the eye to color, most research has shown that a sub-sample of the color components by a factor of four in the horizontal and vertical directions is reasonable. Accordingly, a video signal may be represented by four luminance components and two chrominance components.

Using ABSDCT, a video signal will generally be segmented into blocks of pixels for processing. For each block, the luminance and chrominance components are passed to a block interleaver. For example, a 16×16 (pixel) block may be presented to the block interleaver, which orders or organizes the image samples within each 16×16 block to produce blocks and composite sub-blocks of data for discrete cosine transform (DCT) analysis. The DCT operator is one method of converting a time and spatial sampled signal to a frequency representation of the same signal. By converting to a frequency representation, the DCT techniques have been shown to allow for very high levels of compression, as quantizers can be designed to take advantage of the frequency distribution characteristics of an image. In a preferred embodiment, one 16×16 DCT is applied to a first ordering, four 8×8 DCTs are applied to a second ordering, 16 4×4 DCTs are applied to a third ordering, and 64 2×2 DCTs are applied to a fourth ordering.

The DCT operation reduces the spatial redundancy inherent in the video source. After the DCT is performed, most of the video signal energy tends to be concentrated in a few DCT coefficients. An additional transform, the Differential Quad-Tree Transform (DQT), may be used to reduce the redundancy among the DCT coefficients.

For the 16×16 block and each sub-block, the DCT coefficient values and the DQT value (if the DQT is used) are analyzed to determine the number of bits required to encode the block or sub-block. Then, the block or the combination of sub-blocks that requires the least number of bits to encode is chosen to represent the image segment. For example, two 8×8 sub-blocks, six 4×4 sub-blocks, and eight 2×2 sub-blocks may be chosen to represent the image segment.

The chosen block or combination of sub-blocks is then properly arranged in order into a 16×16 block. The DCT/DQT coefficient values may then undergo frequency weighting, quantization, and coding (such as variable length coding) in preparation for transmission. Although the ABS-DCT technique described above performs remarkably well, it is computationally intensive. Thus, compact hardware implementation of the technique may be difficult.

Variable length coding has been accomplished in the form of run length and size. Other compression methods, such as Joint Photographic Experts Group (JPEG) or Moving Picture Experts Group (MPEG-2), use a standard zig-zag scanning method over the entire processed block size. Using ABSDCT, however, different block sizes are generated, based on the variance within blocks of data. Accordingly, a standard zig-zag scanning method is not always optimal over the entire processed block size. Further, standard zig-zag scanning method over each block size may be difficult to implement in hardware. Moreover, a zig-zag pattern is not always the optimal pattern for a given block or frame. Accordingly, a method and apparatus to determine the optimal pattern is needed.

SUMMARY OF THE INVENTION

Embodiments of the invention provide an apparatus and method for an optimal pattern determiner. In one embodiment, the optimal pattern is configurable on a frame by frame basis. In another embodiment, a default pattern of a predetermined block size is used, regardless of the actual block size as determined by the adaptive block size discrete cosine transform (ABSDCT) technique.

The present invention is a quality based system and method of image compression that utilizes adaptively sized blocks and sub-blocks of Discrete Cosine Transform coefficient data and a quality based quantization scale factor. A block of pixel data is input to an encoder. The encoder comprises a block size assignment (BSA) element, which segments the input block of pixels for processing. The block size assignment is based on the variances of the input block and further subdivided blocks. In general, areas with larger variances are subdivided into smaller blocks, and areas with smaller variances are not be subdivided, provided the block and sub-block mean values fall into different predetermined ranges. Thus, first the variance threshold of a block is modified from its nominal value depending on its mean value, and then the variance of the block is compared with a threshold, and if the variance is greater than the threshold, then the block is subdivided.

The block size assignment is provided to a transform element, which transforms the pixel data into frequency domain data. The transform is performed only on the block and sub-blocks selected through block size assignment. The transform data then undergoes scaling through quantization and serialization. Quantization of the transform data is quantized based on an image quality metric, such as a scale factor that adjusts with respect to contrast, coefficient count, rate distortion, density of the block size assignments, and/or past scale factors. Serialization is based on creating the longest possible run lengths of the same value. In an embodiment, zigzag scanning at a fixed block size is utilized to serialize the data to produce a stream of data, regardless of the block size assignment. In another embodiment, the block size is 8×8. The stream of data may be coded by a variable length coder in preparation of transmission. The encoded data is sent through a transmission channel to a decoder, where the pixel data is reconstructed in preparation for display.

In another embodiment, a method of serializing frequency based image data in a digital cinema system is described. At least one group of data that may be represented as a 16×16 block of data is compiled. Alternatively, a frame of data is compiled. The group of data is divided into four groups, each which may be represented as an 8×8 blocks. Each of the four 8×8 blocks of data are serialized using zig-zag scanning vertical scanning, and/or horizontal scanning.

Accordingly, it is an aspect of an embodiment to process blocks of data using a fixed pattern of scanning in 8×8 blocks, regardless of the actual block size assignment.

It is another aspect of an embodiment to determine and implement an optimal scanning technique on a frame by frame basis.

It is another aspect of an embodiment to provide the user with configurable scanning patterns.

BRIEF DESCRIPTION OF THE DRAWINGS

The features and advantages of the present invention will become more apparent from the detailed description set forth below when taken in conjunction with the drawings in which like reference characters identify correspondingly throughout and wherein:

FIG. 4a illustrates an exemplary block size assignment;

DETAILED DESCRIPTION OF THE PREFERRED EMBODIMENTS

Figure 1:
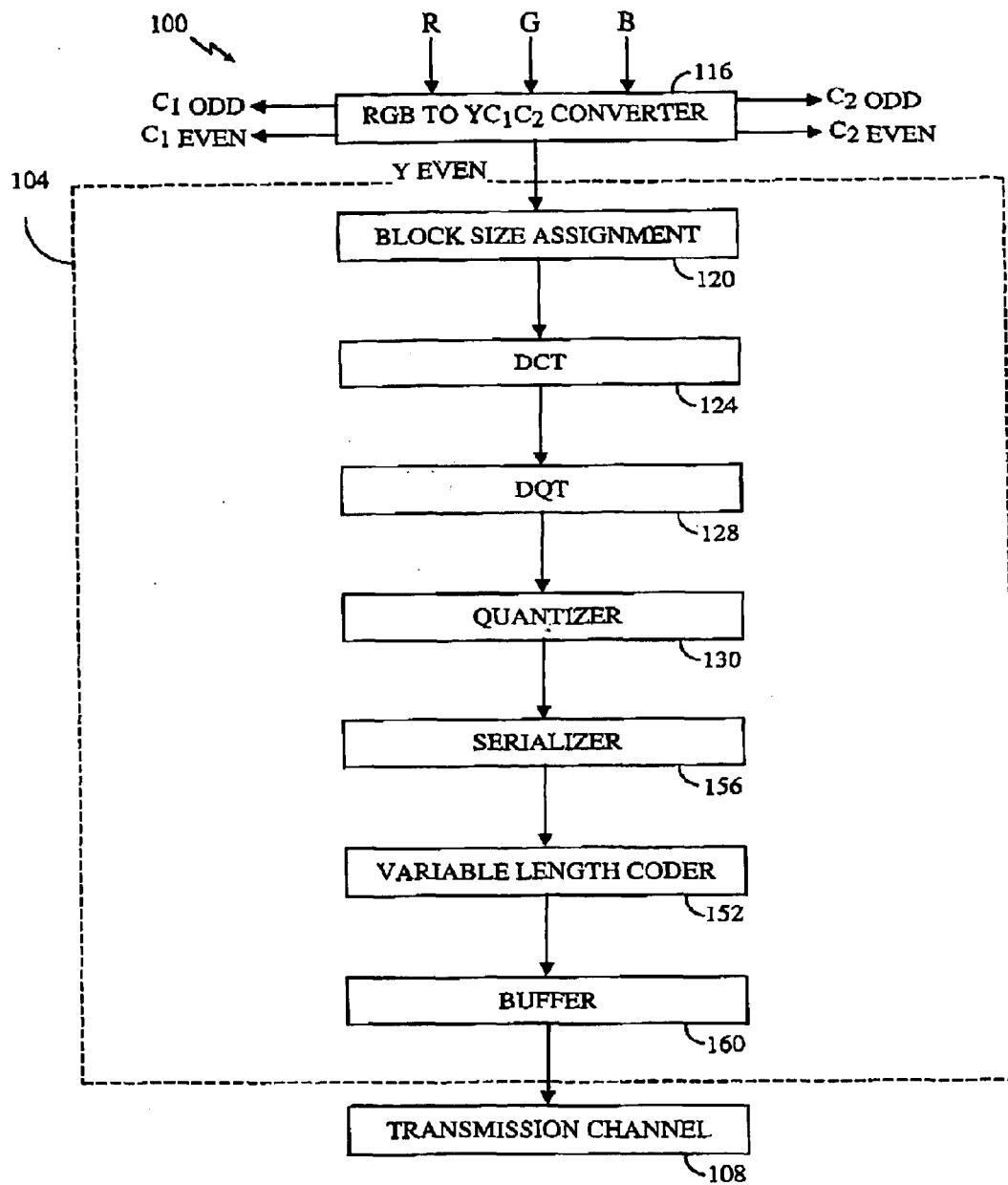
FIG. 1 is a block diagram of an encoder portion of a quality based image processing system incorporating the variance based block size assignment system and method of the present invention.

In order to facilitate digital transmission of digital signals and enjoy the corresponding benefits, it is generally necessary to employ some form of signal compression. To achieve high compression in a resulting image, it is also important that high quality of the image be maintained. Furthermore, computational efficiency is desired for compact hardware implementation, which is important in many applications.

Before one embodiment of the invention is explained in detail, it is to be understood that the invention is not limited in its application to the details of the construction and the arrangement of the components set forth in the following description or illustrated in the drawings. The invention is capable of other embodiments and are carried out in various ways. Also, it is understood that the phraseology and terminology used herein is for purpose of description and should not be regarded as limiting.

Image compression employed in an aspect of an embodiment is based on discrete cosine transform (DCT) techniques, such as that disclosed in co-pending U.S. patent application "Contrast Sensitive Variance Based Adaptive Block Size DCT Image Compression", Ser. No. 09/436,085 filed on Nov. 8, 1999, assigned to the assignee of the present invention and incorporated herein by reference. Generally, an image to be processed in the digital domain is composed of pixel data divided into an array of non-overlapping blocks, N×N in size. A two-dimensional DCT may be performed on each block. The two-dimensional DCT is defined by the following relationship:

$$X(k, l) = \frac{\alpha(k)\beta(l)}{\sqrt{N*M}} \sum_{m=0}^{N-1}\sum_{n=0}^{N-1} x(m, n)\cos\left[\frac{(2m+1)\pi k}{2N}\right]\cos\left[\frac{(2n+1)\pi l}{2N}\right],$$

$$0 \le k, l \le N-1$$

$$\text{where } \alpha(k), \beta(k) = \begin{cases} 1, & \text{if } k = 0 \\ \sqrt{2}, & \text{if } k \ne 0 \end{cases}, \text{ and}$$

x(m,n) is the pixel at location (m,n) within an N×M block, and

X(k,l) is the corresponding DCT coefficient.

Since pixel values are non-negative, the DCT component X(0,0) is always positive and usually has the most energy. In fact, for typical images, most of the transform energy is concentrated around the component X(0,0). This energy compaction property is what makes the DCT technique such an attractive compression method.

The image compression technique utilizes contrast adaptive coding to achieve further bit rate reduction. It has been observed that most natural images are made up of relatively slow varying flat areas, and busy areas such as object boundaries and high-contrast texture. Contrast adaptive coding schemes take advantage of this factor by assigning more bits to the busy areas and less bits to the less busy areas.

Contrast adaptive methods utilize intraframe coding (spatial processing) instead of interframe coding (spatio-temporal processing). Interframe coding inherently requires multiple frame buffers in addition to more complex processing circuits. In many applications, reduced complexity is needed for actual implementation. Intraframe coding is also useful in a situation that can make a spatio-temporal coding scheme break down and perform poorly. For example, 24 frame per second movies can fall into this category since the integration time, due to the mechanical shutter, is relatively short. The short integration time allows a higher degree of temporal aliasing. The assumption of frame to frame correlation breaks down for rapid motion as it becomes jerky. Intraframe coding is also easier to standardize when both 50 Hz and 60 Hz power line frequencies are involved. Television currently transmits signals at either 50 Hz or 60 Hz. The use of an intraframe scheme, being a digital approach, can adapt to both 50 Hz and 60 Hz operation, or even to 24 frame per second movies by trading off frame rate versus spatial resolution.

For image processing purposes, the DCT operation is performed on pixel data that is divided into an array of non-overlapping blocks. Note that although block sizes are discussed herein as being N×N in size, it is envisioned that various block sizes may be used. For example, a N×M block size may be utilized where both N and M are integers with M being either greater than or less than N. Another important aspect is that the block is divisible into at least one level of sub-blocks, such as N/ixN/i, N/ixN/j, N/ixM/j, and etc. where i and j are integers. Furthermore, the exemplary block size as discussed herein is a 16×16 pixel block with corresponding block and sub-blocks of DCT coefficients. It is further envisioned that various other integers such as both even or odd integer values may be used, e.g., 9×9.

Figure 2:
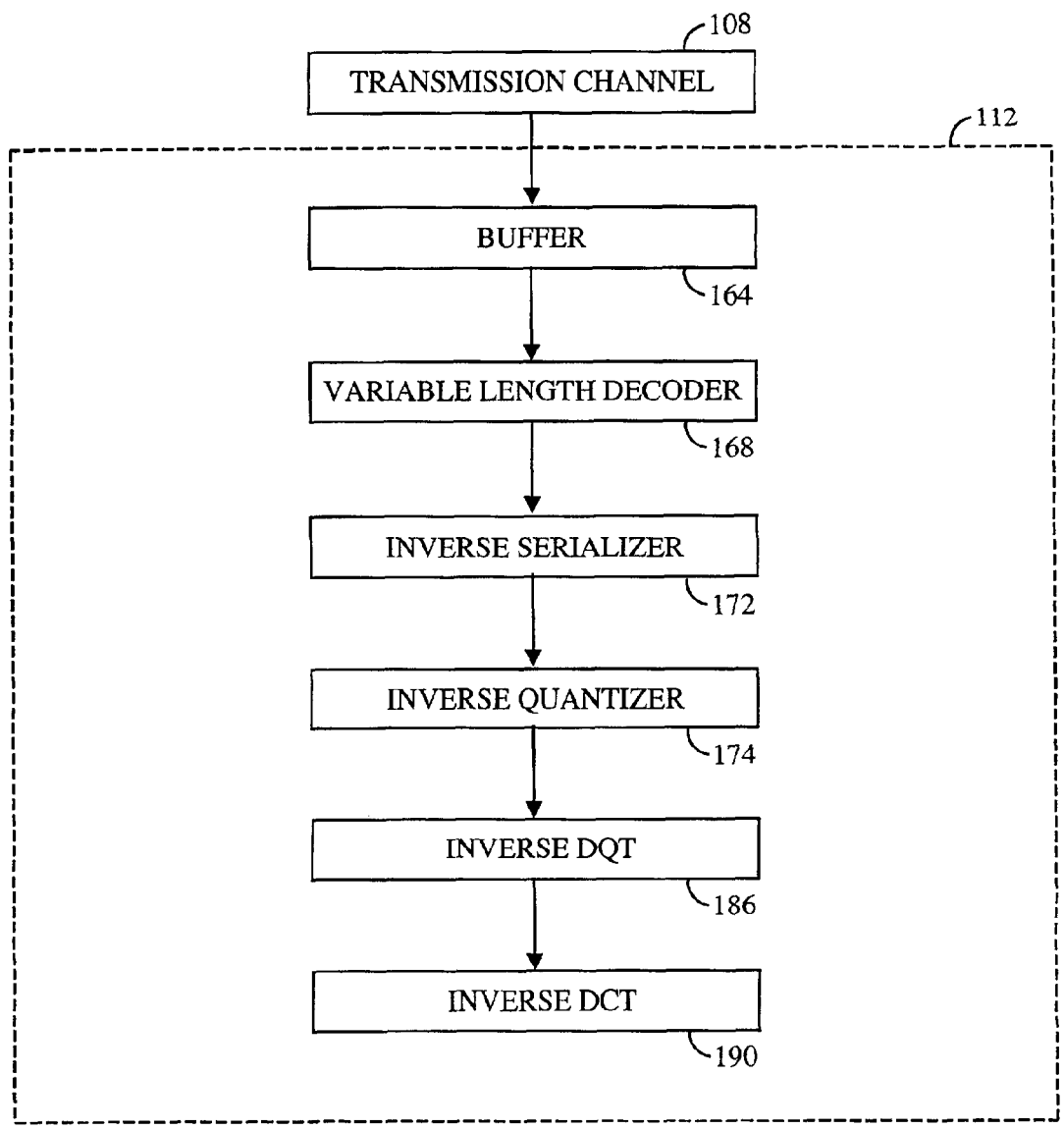
FIG. 2 is a block diagram of a decoder portion of a quality based image processing system incorporating the variance based block size assignment system and method of the present invention.

FIGS. 1 and 2 illustrate an image processing system 100 incorporating the concept of configurable serializer. The image processing system 100 comprises an encoder 104 that compresses a received video signal. The compressed signal is transmitted using a transmission channel or a physical medium 108, and received by a decoder 112. The decoder 112 decodes the received encoded data into image samples, which may then be exhibited.

In general, an image is divided into blocks of pixels for processing. A color signal may be converted from RGB space to $YC_1C_2$ space using a RGB to $YC_1C_2$ converter 116, where Y is the luminance, or brightness, component, and $C_1$ and $C_2$ are the chrominance, or color, components. Because of the low spatial sensitivity of the eye to color, many systems sub-sample the $C_1$ and $C_2$ components by a factor of four in the horizontal and vertical directions. However, the sub-sampling is not necessary. A full resolution image, known as 4:4:4 format, may be either very useful or necessary in some applications such as those referred to as covering "digital cinema." Two possible $YC_1C_2$ representations are, the YIQ representation and the YUV representation, both of which are well known in the art. It is also possible to employ a variation of the YUV representation known as YCbCr. This may be further broken into odd and even components. Accordingly, in an embodiment the representation Y-even, Y-odd, Cb-even, Cb-odd, Cr-even, Cr-odd is used.

In a preferred embodiment, each of the even and odd Y, Cb, and Cr components is processed without sub-sampling. Thus, an input of each of the six components of a 16×16 block of pixels is provided to the encoder 104. For illustration purposes, the encoder 104 for the Y-even component is illustrated. Similar encoders are used for the Y-odd component, and even and odd Cb and Cr components. The encoder 104 comprises a block size assignment element 120, which performs block size assignment in preparation for video compression. The block size assignment element 120 determines the block decomposition of the 16×16 block based on the perceptual characteristics of the image in the block. Block size assignment subdivides each 16×16 block into smaller blocks, such as 8×8, 4×4, and 2×2, in a quad-tree fashion depending on the activity within a 16×16 block. The block size assignment element 120 generates a quad-tree data, called the PQR data, whose length can be between 1 and 21 bits. Thus, if block size assignment determines that a 16×16 block is to be divided, the R bit of the PQR data is set and is followed by four additional bits of Q data corresponding to the four divided 8×8 blocks. If block size assignment determines that any of the 8×8 blocks is to be subdivided, then four additional bits of P data for each 8×8 block subdivided are added.

Figure 3:
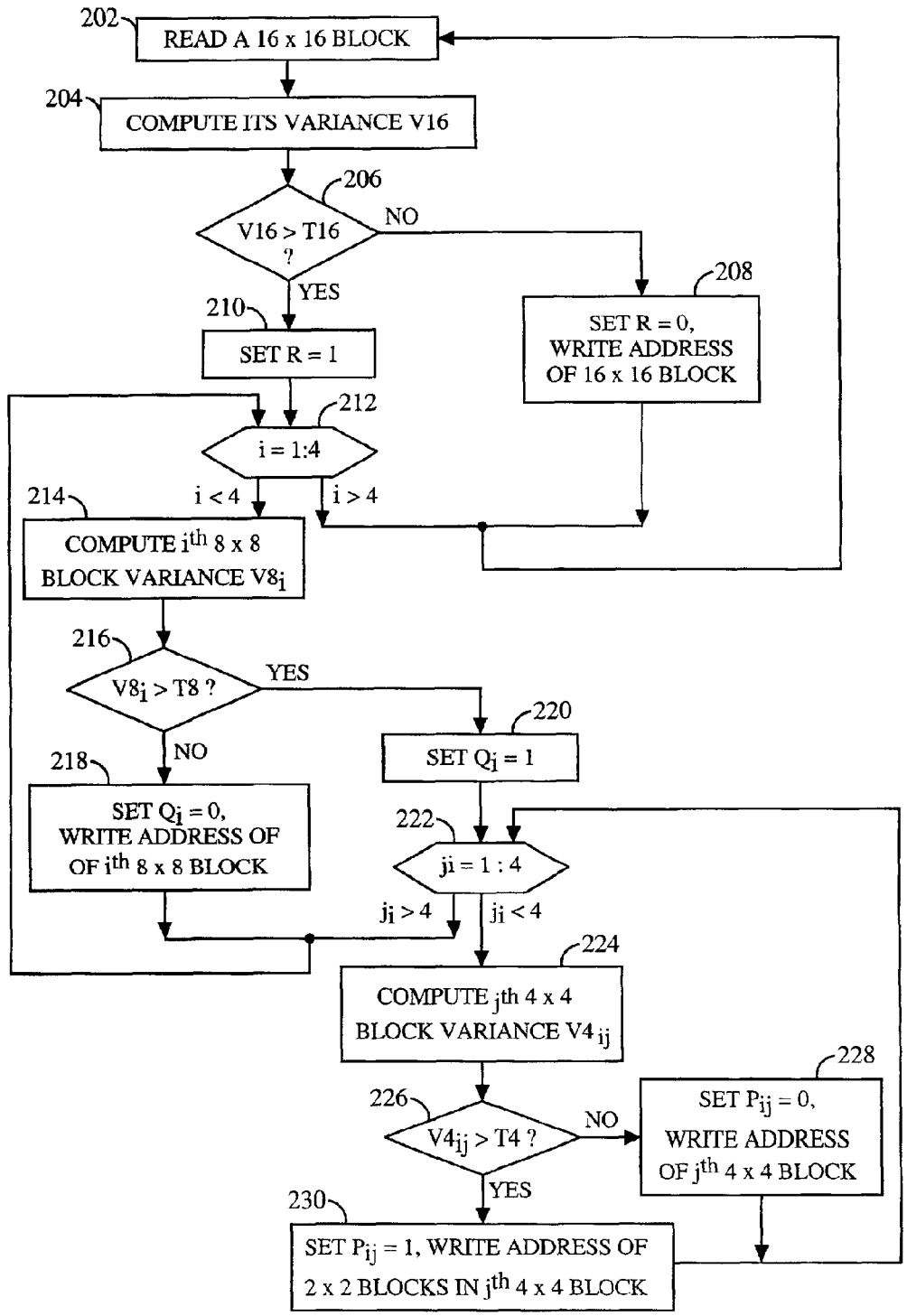
FIG. 3 is a flow diagram illustrating the processing steps involved in variance based block size assignment.

Referring now to FIG. 3, a flow diagram showing details of the operation of the block size assignment element 120 is provided. The variance of a block is used as a metric in the decision to subdivide a block. Beginning at step 202, a 16×16 block of pixels is read. At step 204, the variance, v16, of the 16×16 block is computed. The variance is computed as follows:

$$\text{var} = \frac{1}{N^2}\sum_{i=0}^{N-1}\sum_{j=0}^{N-1} x_{i,j}^2 - \left(\frac{1}{N^2}\sum_{i=0}^{N-1}\sum_{j=0}^{N-1} x_{i,j}\right)^2$$

where N=16, and $x_{ij}$ is the pixel in the $i^{th}$ row, $j^{th}$ column within the N×N block. At step 206, first the variance threshold T16 is modified to provide a new threshold T'16 if the mean value of the block is between two predetermined values, then the block variance is compared against the new threshold, T'16.

If the variance v16 is not greater than the threshold T16, then at step 208, the starting address of the 16×16 block is written into temporary storage, and the R bit of the PQR data is set to 0 to indicate that the 16×16 block is not subdivided. The algorithm then reads the next 16×16 block of pixels. If the variance v16 is greater than the threshold T16, then at step 210, the R bit of the PQR data is set to 1 to indicate that the 16×16 block is to be subdivided into four 8×8 blocks.

The four 8×8 blocks, i=1:4, are considered sequentially for further subdivision, as shown in step 212. For each 8×8 block, the variance, v8$_i$, is computed, at step 214. At step 216, first the variance threshold T8 is modified to provide a new threshold T'8 if the mean value of the block is between two predetermined values, then the block variance is compared to this new threshold.

If the variance v8$_i$ is not greater than the threshold T8, then at step 218, the starting address of the 8×8 block is written into temporary storage, and the corresponding Q bit, Q$_i$, is set to 0. The next 8×8 block is then processed. If the variance v8$_i$ is greater than the threshold T8, then at step 220, the corresponding Q bit, Q$_i$, is set to 1 to indicate that the 8×8 block is to be subdivided into four 4×4 blocks.

The four 4×4 blocks, j$_i$=1:4, are considered sequentially for further subdivision, as shown in step 222. For each 4×4 block, the variance, v4$_{ij}$, is computed, at step 224. At step 226, first the variance threshold T4 is modified to provide a new threshold T'4 if the mean value of the block is between two predetermined values, then the block variance is compared to this new threshold.

If the variance v4$_{ij}$ is not greater than the threshold T4, then at step 228, the address of the 4×4 block is written, and the corresponding P bit, P$_{ij}$, is set to 0. The next 4×4 block is then processed. If the variance v4$_{ij}$ is greater than the threshold T4, then at step 230, the corresponding P bit, P$_{ij}$, is set to 1 to indicate that the 4×4 block is to be subdivided into four 2×2 blocks. In addition, the address of the 4 2×2 blocks are written into temporary storage.

The thresholds T16, T8, and T4 may be predetermined constants. This is known as the hard decision. Alternatively, an adaptive or soft decision may be implemented. For example, the soft decision varies the thresholds for the variances depending on the mean pixel value of the 2N×2N blocks, where N can be 8, 4, or 2. Thus, functions of the mean pixel values, may be used as the thresholds.

Figure 4B:
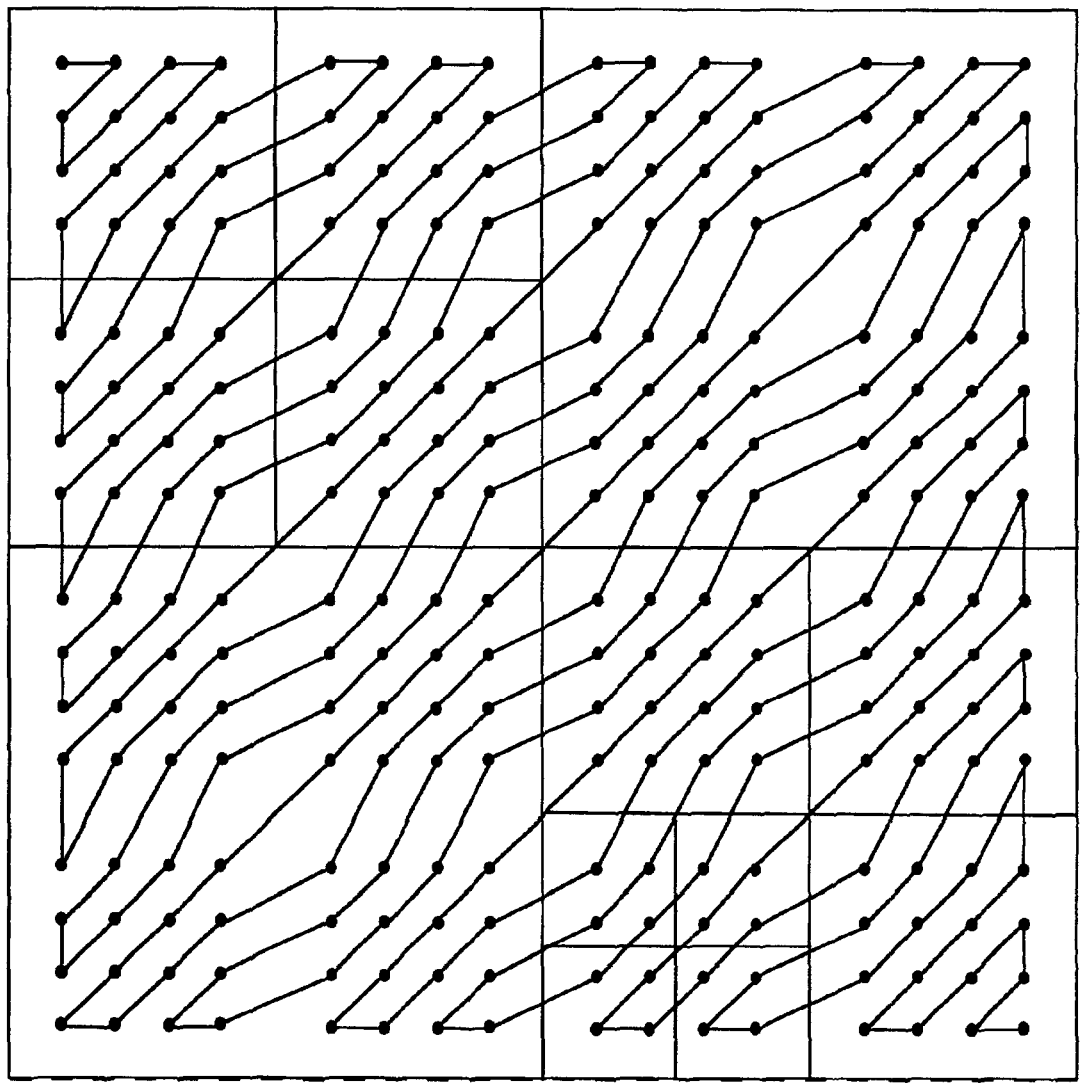
FIG. 4b illustrates a zig-zag scan pattern across a 16×16 block size.

For purposes of illustration, consider the following example. Let the predetermined variance thresholds for the Y component be 50, 1100, and 880 for the 16×16, 8×8, and 4×4 blocks, respectively. In other words, T16=50, T8=1100, and T4=880. Let the range of mean values be 80 and 100. Suppose the computed variance for the 16×16 block is 60. Since 60 is greater than T16, and the mean value 90 is between 80 and 100, the 16×16 block is subdivided into four 8×8 sub-blocks. Suppose the computed variances for the 8×8 blocks are 1180, 935, 980, and 1210. Since two of the 8×8 blocks have variances that exceed T8, these two blocks are further subdivided to produce a total of eight 4×4 sub-blocks. Finally, suppose the variances of the eight 4×4 blocks are 620, 630, 670, 610, 590, 525, 930, and 690, with corresponding means values 90, 120, 110, 115. Since the mean value of the first 4×4 block falls in the range (80, 100), its threshold will be lowered to T'4=200 which is less than 880. So, this 4×4 block will be subdivided as well as the seventh 4×4 block. The resulting block size assignment is shown in FIG. 4a. The corresponding quad-tree decomposition is shown in FIG. 4b. Additionally, the PQR data generated by this block size assignment is shown in FIG. 4c.

Note that a similar procedure is used to assign block sizes for the color components Y-odd, $C_{b-even}$, $C_{b-odd}$, $C_{r-even}$ and $C_{r-odd}$. The color components may be decimated horizontally, vertically, or both.

Additionally, note that although block size assignment has been described as a top down approach, in which the largest block (16×16 in the present example) is evaluated first, a bottom up approach may instead be used. The bottom up approach will evaluate the smallest blocks (2×2 in the present example) first.

Referring back to FIG. 1, the PQR data, along with the addresses of the selected blocks, are provided to a DCT element 124. The DCT element 124 uses the PQR data to perform discrete cosine transforms of the appropriate sizes on the selected blocks. Only the selected blocks need to undergo DCT processing.

The image processing system 100 also comprises DQT element 128 for reducing the redundancy among the DC coefficients of the DCTs. A DC coefficient is encountered at the top left corner of each DCT block. The DC coefficients are, in general, large compared to the AC coefficients. The discrepancy in sizes makes it difficult to design an efficient variable length coder. Accordingly, it is advantageous to reduce the redundancy among the DC coefficients.

The DQT element 128 performs 2-D DCTs on the DC coefficients, taken 2×2 at a time. Starting with 2×2 blocks within 4×4 blocks, a 2-D DCT is performed on the four DC coefficients. This 2×2 DCT is called the differential quad-tree transform, or DQT, of the four DC coefficients. Next, the DC coefficient of the DQT along with the three neighboring DC coefficients within an 8×8 block are used to compute the next level DQT. Finally, the DC coefficients of the four 8×8 blocks within a 16×16 block are used to compute the DQT. Thus, in a 16×16 block, there is one true DC coefficient and the rest are AC coefficients corresponding to the DCT and DQT.

The transform coefficients (both DCT and DQT) are provided to a quantizer for quantization. In a preferred embodiment, the DCT coefficients are quantized using frequency weighting masks (FWMs) and a quantization scale factor. A FWM is a table of frequency weights of the same dimensions as the block of input DCT coefficients. The frequency weights apply different weights to the different DCT coefficients. The weights are designed to emphasize the input samples having frequency content that the human visual or optical system is more sensitive to, and to de-emphasize samples having frequency content that the visual or optical system is less sensitive to. The weights may also be designed based on factors such as viewing distances, etc.

The weights are selected based on empirical data. A method for designing the weighting masks for 8×8 DCT coefficients is disclosed in ISO/IEC JTC1 CD 10918, "Digital compression and encoding of continuous-tone still images—part 1: Requirements and guidelines," International Standards Organization, 1994, which is incorporated herein by reference. In general, two FWMs are designed, one for the luminance component and one for the chrominance components. The FWM tables for block sizes 2×2, 4×4 are obtained by decimation and 16×16 by interpolation of that for the 8×8 block. The scale factor controls the quality and bit rate of the quantized coefficients.

Thus, each DCT coefficient is quantized according to the relationship:

$$DCT_q(i, j) = \left\lfloor \frac{8*DCT(i, j)}{fwm(i, j)*q} \pm \frac{1}{2} \right\rfloor$$

where DCT(i,j) is the input DCT coefficient, fwm(i,j) is the frequency weighting mask, q is the scale factor, and DCTq(i,j) is the quantized coefficient. Note that depending on the sign of the DCT coefficient, the first term inside the braces is rounded up or down. The DQT coefficients are also quantized using a suitable weighting mask. However, multiple tables or masks can be used, and applied to each of the Y, Cb, and Cr componants.

The block of pixel data and frequency weighting masks are then scaled by a quantizer 130, or a scale factor element. In a preferred embodiment, there are 32 scale factors corresponding to average bit rates. Unlike other compression methods such as MPEG2, the average bit rate is controlled based on the quality of the processed image, instead of target bit rate and buffer status.

The quantized coefficients are provided to a scan serializer 152. The serializer 152 scans the blocks of quantized coefficients to produce a serialized stream of quantized coefficients. Zig-zag scans, column scanning, or row scanning may be employed. A number of different zigzag scanning patterns, as well as patterns other than zigzag may also be chosen. A preferred technique employs 8×8 block sizes for the zigzag scanning, although other sizes may be employed.

Figure 4B:
Figure 4C:
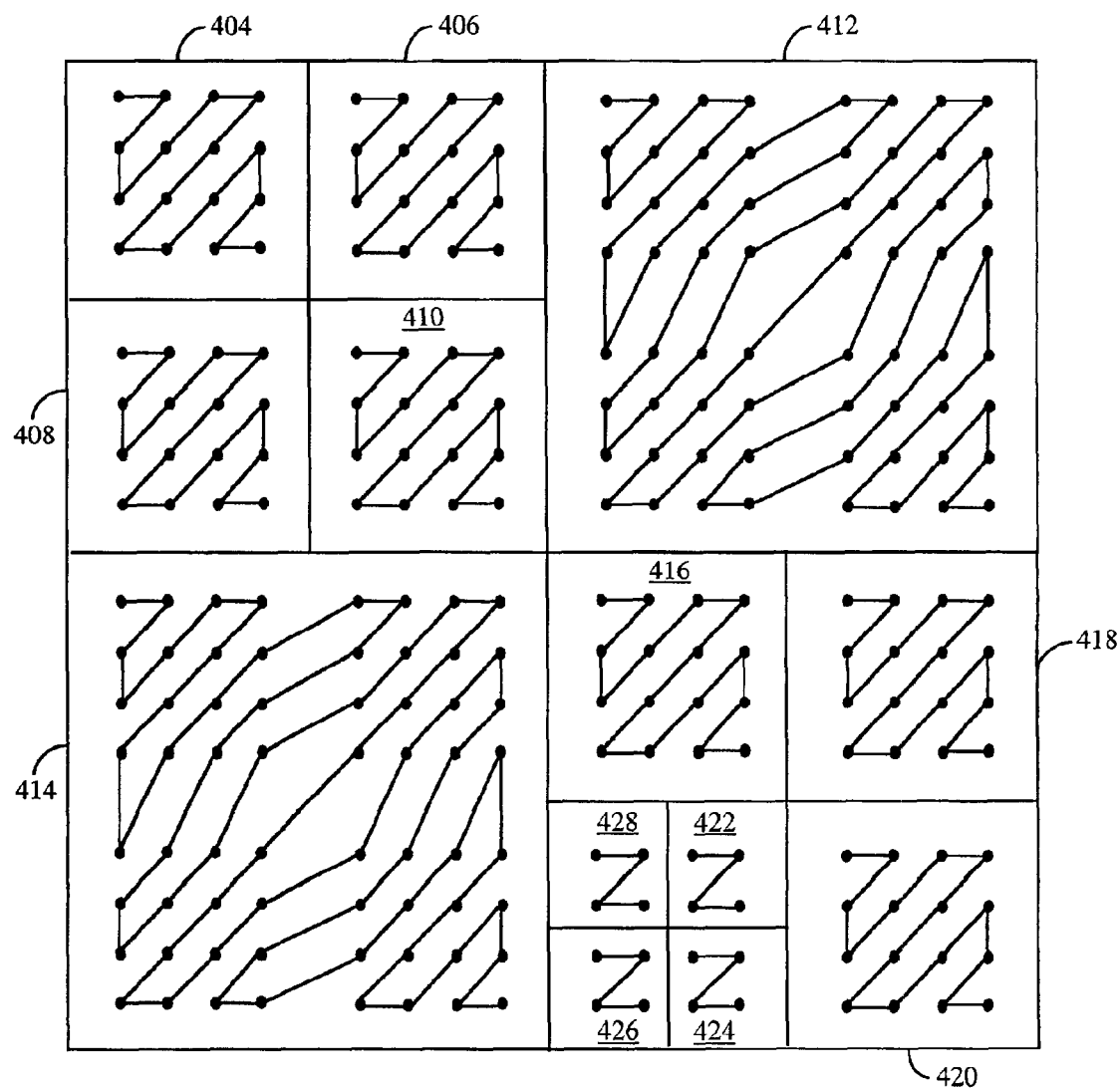
FIG. 4c illustrates a zig-zag scan pattern within each variable block size.

Different scanning techniques are described herein, with respect to FIGS. 4 and 5. FIG. 4b illustrates a zig-zag scan across an entire 16×16 block 400. In a frequency based block such as the DCT, values are encoded and represented such that the DC value is in the upper left corner, and AC values diminish in value upon approaching the lower right corner. Therefore, a scanning technique of zig-zag scanning across the entire 16×16 block, regardless of the block size assignment within the 16×16 block, leads to inefficiencies in coding. In other words, zig-zag scanning in such a manner leads to shorter run lengths of the same value.

FIG. 4c illustrates a more optimal scanning technique, taking advantage of the order in which coefficients are ordered in a given block. Each block 404, 406, 408, 410, 412, 414, 416, 418, 420, 422, 424, 426, and 428 employ a seperate zig-zag scan. In an embodiment, each block may employ different scanning patterns, such as vertical or horizontal, or reverse zig-zag. Although this embodiment is highly optimized in preserving maximum run lengths, computing separate zig-zag scans for each block is more computationally intensive, and, in hardware, may be more difficult to implement.

Figure 5A:
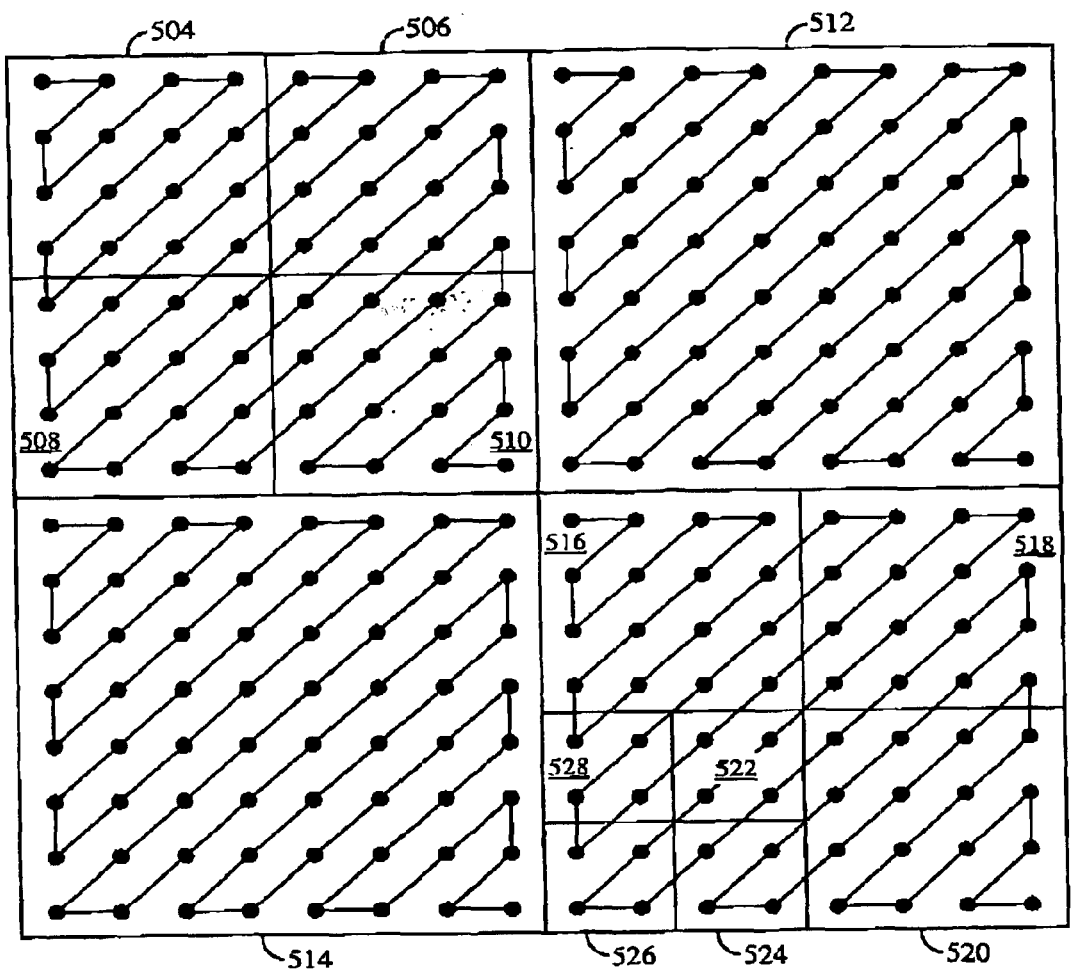
FIG. 5a illustrates a zig-zag scan pattern of 8×8 blocks independent of the actual block sizes.
Figure 5B:
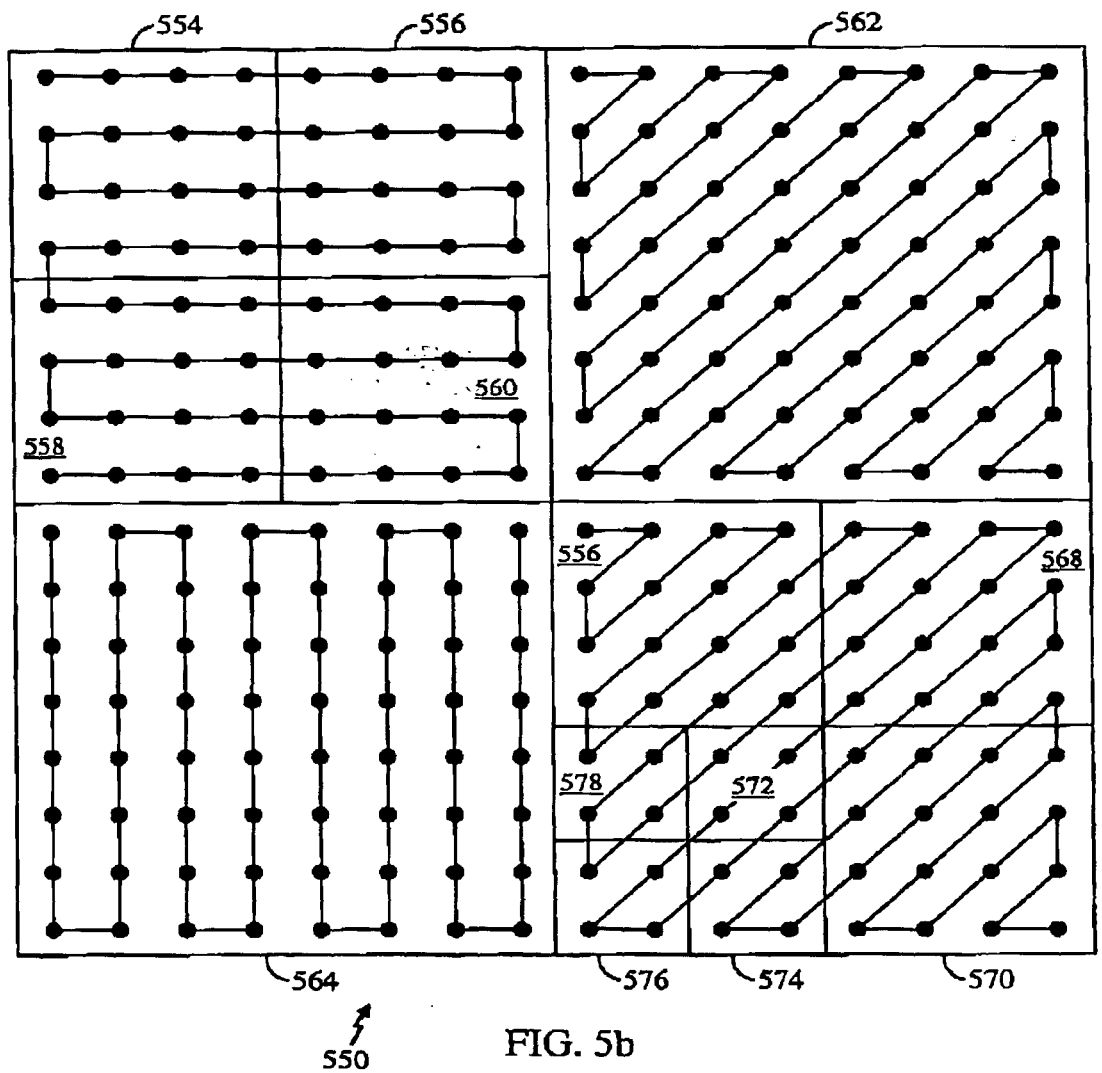
FIG. 5b illustrates different scan patterns implemented in 8×8 blocks independent of the actual block sizes.

Accordingly, it has been determined that scanning implementations such as those described in FIGS. 5a and 5b may balance optimization of maximizing run lengths balanced with ease in hardware implementation. FIG. 5a illustrates a 16×16 block 500, subdivided by the block size assignment into blocks 504, 506, 508, 510, 512, 514, 516, 518, 520, 522, 524, 526, and 528. In an embodiment, regardless of the BSA breakdown, zig-zag scanning on each 8×8 quadrant of the 16×16 block is employed. Thus, blocks 504, 506, 508, and 510 are serialized by a zig-zag scan, block 512 is serialized by a zig-zag scan, block 514 is serialized by a zig-zag scan, and blocks 516, 518, 520, 522, 524, 526, and 528 are serialized by a zig-zag scan.

FIG. 5b illustrates a 16×16 block 550, subdivided by the block size assignment into blocks 554, 556, 558, 560, 562, 564, 566, 568, 570, 572, 574, 576, and 578. In this embodiment, different types of scanning is employed on each 8×8 quadrant of the 16×16 block. The type of scanning employed is determined by evaluating the values within the 8×8 block, and determining a scanning method that is the most efficient. For example, in FIG. 5b, horizontal scanning is employed for blocks 554, 556, 558, 560, block 562 is serialized by a zig-zag scan, block 564 is serialized by a vertical scan, and blocks 566, 568, 570, 572, 574, 576, and 578 are serialized by a zig-zag scan. In an alternate embodiment, the optimal scanning method is determined on a frame by frame basis, as opposed to a block by block basis. Determining the optimal scanning method on a frame by frame basis is less computationally intensive as opposed to the block by block method.

Figure 6A:
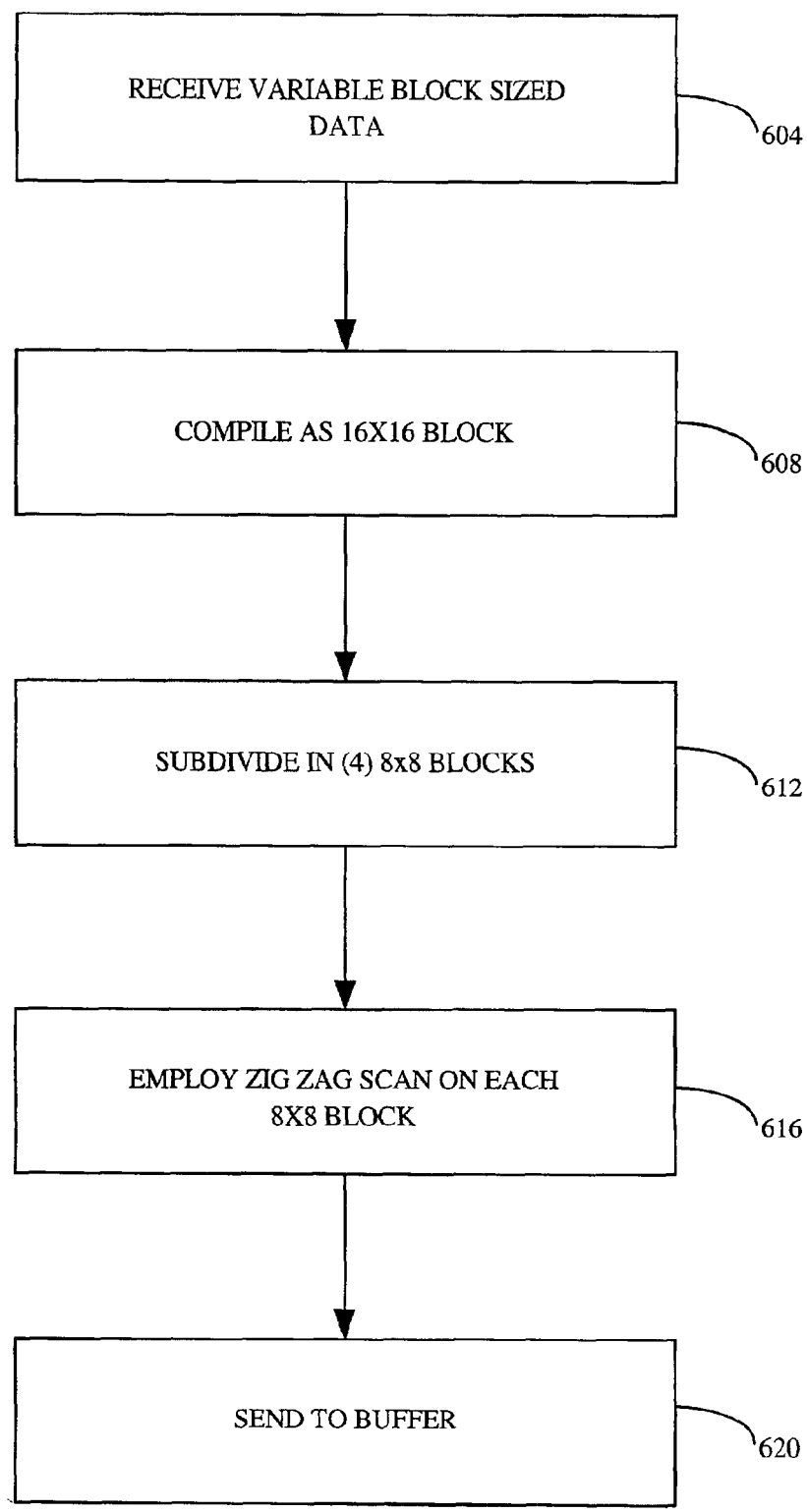
FIG. 6a illustrates an embodiment of a serializing process.

FIG. 6a illustrates a process 600 by which serializing occurs. A group of data is read 604. Since the data being read is based on variable block sizes, the data being read in is not of a uniform size or length. Data is compiled 608 or constructed into a form that may be represented as a 16×16 block. The data is then divided 612 into four 8×8 block sizes. A zig-zag scan is then performed 616 on each 8×8 block. The data is then routed 620 to a buffer.

Figure 6B:
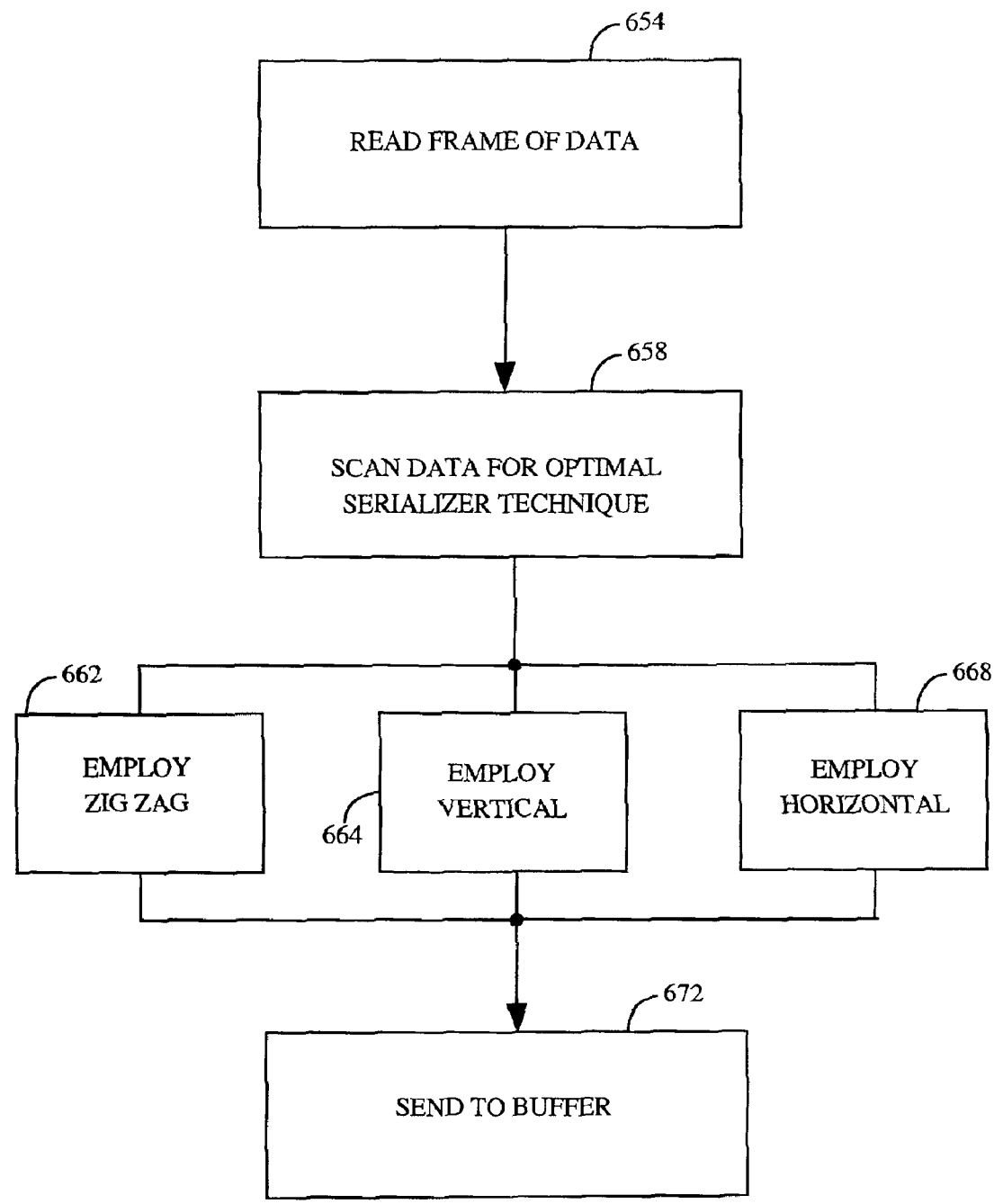
FIG. 6b illustrates an alternate embodiment of a serializing process.
Figure 6B:

FIG. 6b illustrates an alternate embodiment 650 of serializing. A frame of data 654 is read. The frame of data is evaluated 658 to determine the optimal serializing technique. Based on the evaluation, a zig-zag scan 662, a vertical scan 664, or a horizontal scan 668 is employed. Upon serializing based upon one of the scanning methods, the data is routed 672 to a buffer.

Referring back to FIG. 1, the stream of serialized, quantized coefficients is provided to a variable length coder 156. The variable length coder 156 may make use of run-length encoding of zeros followed by Huffman encoding. This technique is discussed in detail in aforementioned U.S. Pat. Nos. 5,021,891, 5,107,345, and 5,452,104, which are incorporated by reference and summarized herein. A run-length coder would take the quantized coefficients and separate out the zero from the non-zero coefficients. The zero values are referred to as run-length values, and are Huffman encoded. The non-zero values are separately Huffman encoded.

A modified Huffman coding of the quantized coefficients is also possible and is used in the preferred embodiment. Here, after zigzag scanning, a run-length coder will determine the run-length/size pairs within each 8×8 block. These run-length/size pairs are then Huffman encoded.

Huffman codes are designed from either the measured or theoretical statistics of an image. It has been observed that most natural images are made up of flat or relatively slowly varying areas, and busy areas such as object boundaries and high-contrast texture. Huffman coders with frequency-domain transforms such as the DCT exploit these features by assigning more bits to the busy areas and fewer bits to the flat areas. In general, Huffman coders make use of look-up tables to code the run-length and the non-zero values. Multiple tables are generally used, with 3 tables being preferred in the present invention, although 1 or 2 can be employed, as desired.

The compressed image signal generated by the encoder 104 may be temporarily stored using a buffer 160, and then transmitted to the decoder 112 using the transmission channel 108. The PQR data, which contains the block size assignment information, is also provided to the decoder 112. The decoder 112 comprises a buffer 164 and a variable length decoder 168, which decodes the run-length values and the non-zero values.

The output of the variable length decoder 168 is provided to an inverse serializer 172 that orders the coefficients according to the scan scheme employed. For example, if a mixture of zig-zag scanning, vertical scanning, and horizontal scanning were used, the inverse serializer 172 would appropriately re-order the coefficients with the knowledge of the type of scanning employed. The inverse serializer 172 receives the PQR data to assist in proper ordering of the coefficients into a composite coefficient block.

The composite block is provided using a selector 174 to an inverse quantizer 176, for undoing the processing due to the use of the quantizer scale factor and the frequency weighting masks.

The coefficient block is then provided to an IDQT element 186, followed by an IDCT element 186, if the Differential Quad-tree transform had been applied. Otherwise, the coefficient block is provided directly to the IDCT element 190. The IDQT element 186 and the IDCT element 190 inverse transform the coefficients to produce a block of pixel data. The pixel data may then have to be interpolated, converted to RGB form, and then stored for future display.

Accordingly, a system and method is presented for image compression that performs block size assignment based on pixel variance. Variance based block size assignment offers several advantages. Because the Discrete Cosine Transform is performed after block sizes are determined, efficient computation is achieved. The computationally intensive transform need only be performed on the selected blocks. In addition, the block selection process is efficient, as the variance of pixel values is mathematically simple to calculate. Still another advantage of variance based block size assignment is that it is perceptually based. Pixel variance is a measure of the activity in a block, and provides indication of the presence of edges, textures, etc. It tends to capture the details of a block much better than measures such as the average of pixel values. Thus, the variance based scheme of the present invention assigns smaller blocks to regions with more edges and larger blocks to the flatter regions. As a result, outstanding quality may be achieved in the reconstructed images.

As examples, the various illustrative logical blocks, flowcharts, and steps described in connection with the embodiments disclosed herein may be implemented or performed in hardware or software with an application-specific integrated circuit (ASIC), a programmable logic device, discrete gate or transistor logic, discrete hardware components, such as, e.g., registers and FIFO, a processor executing a set of firmware instructions, any conventional programmable software and a processor, or any combination thereof. The processor may advantageously be a microprocessor, but in the alternative, the processor may be any conventional processor, controller, microcontroller, or state machine. The software could reside in RAM memory, flash memory, ROM memory, registers, hard disk, a removable disk, a CD-ROM, a DVD-ROM or any other form of storage medium known in the art.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

Other features and advantages of the invention are set forth in the following claims.

What we claim as our invention is:

1. In a digital cinema system, a method of serializing frequency based image data, the method comprising:
   compiling at least one group of data that may be represented as a 16×16 block;
   dividing the group of data into groups that may be represented as four 8×8 blocks;
   evaluating one or more values within the 8×8 block to determine the most efficient scanning scheme of serializing; and
   serializing each of the four 8×8 blocks of data according to the determined scheme.

2. The method set forth in claim 1, wherein serializing comprises zig-zag scanning each of the four 8×8 blocks of data.

3. The method set forth in claim 1, wherein serializing comprises vertical scanning each of the four 8×8 blocks of data.

4. The method set forth in claim 1, wherein serializing comprises horizontal scanning each of the four 8×8 blacks of data.

5. The method set forth in claim 1, wherein compiling at least one group comprises compiling a frame of data that may be represented as a plurality of 16×16 blocks.

6. The method set forth in claim 1, where the frequency based image data is separated into Y, Cb and Cr color components.

7. The method set forth in claim 6, wherein the Y, Cb and Cr color components are further separated into even and odd color components.

8. In a digital cinema system, a method of compressing a digital image, the image comprising pixel data, the pixel data separated into color components, the method comprising the acts of:
   reading a group of a color component of pixel data;
   generating a block size assignment to divide the group of a color component of pixel into sub-blocks of pixel data;
   transforming the sub-blocks of pixel data into corresponding frequency domain representations; and
   scaling the frequency domain representations into a steam of data, wherein the act of scaling is based on a quality metric correlating with the quality of the image;
   compiling at least one group of data from the stream data that may be represented as a 16×16 block;
   dividing the 16×16 group of data into groups that may be represented as four 8×8 blocks; and
   serializing each of the four 8×8 blocks of data.

9. The method of claim 8, wherein the act of scaling further comprises the act of providing a frequency weighted mask to said sub-blocks of pixel data, such that the frequency weighting mask provides emphasis to the portions of the image that the human visual system is mare sensitive, and provides less emphasis to the portions of the image that the human visual system is less sensitive.

10. The method set forth in claim 8, wherein the act of scaling further comprises the act of quantizing the sub-blocks of pixel data based on the quality of the image.

11. The method set forth in claim 8, wherein the quality metric is the signal to noise ratio.

12. The method set forth in claim 8, wherein the act of transforming performs a Discrete Cosine Transform.

13. The method set forth in claim 8, wherein the act of transforming performs a Discrete Cosine Transform followed by a Differential Quad-tree Transform.

14. The method set forth in claim 8, where the color components are Y, Cb and Cr color components.

15. The method set forth in claim 14, wherein the Y, Cb, and Cr color components are separated into even and odd color components.

16. In a digital cinema system, an apparatus for serializing frequency based image data, the apparatus comprising:
   means for compiling at least one group of date that may be represented as a 16×16 block;
   means for dividing the group of data into groups that may be represented as four 8×8 blocks;
   means for evaluating one or more values within the 8×8 block to determine the most scanning efficient scheme of serializing; and
   means for serializing each of the four 8×8 blocks of data according to the determined scheme.

17. The apparatus set forth in claim 16, wherein the means for serializing comprises means for zig-zag scanning each of the four 8×8 blocks of data.

18. The apparatus set forth in claim 16, wherein the means for serializing comprises means for vertical scanning each of the four 8×8 blocks of data.

19. The apparatus set forth in claim 16, wherein the means for serializing comprises horizontal means for scanning each of the four 8×8 blocks of data.

20. The apparatus set forth in claim 16, wherein the means for compiling at least one group comprises means for compiling a frame of data that may be represented as a plurality of 16×16 blocks.

21. The apparatus set forth in claim 16, where the frequency based image data is separated into Y, Cb and Cr color components.

22. The apparatus set forth in claim 21, further the Y, Cb and Cr color components are further separated into even and odd color components.

23. In a digital cinema system, an apparatus of compressing a digital image, the image comprising pixel data, the pixel data separated into color components, the apparatus comprising:
   means for reading a group of pixel data;
   means for generating a block size assignment to divide the group of pixel into sub-blocks of pixel data;
   means for transforming the sub-blocks of pixel data into corresponding frequency domain representations; and
   means for scaling the frequency domain representations into a stream of data, wherein the act of scaling is based on a quality metric correlating with the quality of the image;
   means for compiling at least one group of data from the stream data that may be represented as a 16×16 block;
   means for dividing the 16×16 group of data into groups that may be represented as four 8×8 blocks; and
   means for serializing each of the four 8×8 blocks of data.

24. The apparatus set forth in claim 23, wherein the act of transforming performs a Discrete Cosine Transform.

25. The apparatus set forth in claim 23, wherein the act of transforming performs a Discrete Cosine Transform followed by a Differential Quad-tree Transform.

26. The apparatus set forth in claim 23, where the color components are Cb and Cr color components.

27. The apparatus set forth in claim 26, wherein the Y, Cb and Cr color components are separated into even and odd color components.

28. In a digital cinema system, an apparatus configured to serialize frequency based image data, the apparatus comprising:
   a compiler configured to compile at least one group of data that may be represented as a 16×16 block;
   a divider configured to divide the group of data into groups that may be represented as four 8×8 blocks;
   a evaluator configured to evaluate one or more values within the 8×8 block to determine the most scanning efficient scheme of serializing; and
   a serializer configured to serialize each of the four 8×8 blocks of data according to the determined scheme.

29. The apparatus set forth in claim 28, wherein the serializer further comprises a zig-zag scanner configured to zig-zag scan each of the four 8×8 blocks of data.

30. The apparatus set forth in claim 28, wherein the serializer further comprises a vertical scanner configured to vertically scan each of the four 8×8 blocks of data.

31. The apparatus set forth in claim 28, wherein the serializer further comprises a horizontal scanner configured to horizontally scan each of the four 8×8 blocks of data.

32. The apparatus set forth in claim 28, wherein die compiler is configured to compile a frame of data that may be represented as a plurality of 16×16 blocks.

33. The apparatus set forth in claim 28, where the frequency based image data is separated into Y, Cb and Cr color components.

34. The apparatus set forth in claim 33, wherein the Y, Cb and Cr color components are further separated into even and odd color components.

35. In a digital cinema system, an apparatus configured to compress a digital image, the image comprising pixel data, the apparatus comprising:
   a reader configured to read a group of pixel data;
   a generator configured to generate a block size assignment to divide the group of pixel into sub-blocks of pixel data;
   a transformer configured to transform the sub-blocks of pixel data into corresponding frequency domain representations;
   a scaler configured to scale the frequency domain representations into a stream of data, wherein the act of scaling is based on a quality metric correlating with the quality of the image;
   a compiler configured to compile am least one group of data from the stream data that may be represented as a 16×16 block;
   a divider configured to divide the 16×16 group of data into groups that may be represented as four 8×8 blocks; and
   a serializer configured to serialize each of the four 8×8 blocks of data.

* * * * *